(12) United States Patent
Untch

(10) Patent No.: US 11,435,016 B2
(45) Date of Patent: Sep. 6, 2022

(54) CLAMPING-ACTION TIE AND ALSO DOCKING METHOD AND COUPLING METHOD

(71) Applicant: Andocksysteme G. Untch GmbH, Badenweiler (DE)

(72) Inventor: Günter Untch, Badenweiler (DE)

(73) Assignee: Andocksysteme G. Untch GmbH, Badenweiler (DE)

(*) Notice: Subject to any disclaimer, the term of this patent is extended or adjusted under 35 U.S.C. 154(b) by 393 days.

(21) Appl. No.: 15/760,402

(22) PCT Filed: Sep. 15, 2016

(86) PCT No.: PCT/EP2016/071786
§ 371 (c)(1),
(2) Date: Mar. 15, 2018

(87) PCT Pub. No.: WO2017/046220
PCT Pub. Date: Mar. 23, 2017

(65) Prior Publication Data
US 2018/0259102 A1    Sep. 13, 2018

(30) Foreign Application Priority Data
Sep. 15, 2015 (DE) .................. 10 2015 115 544.3

(51) Int. Cl.
*F16L 23/04* (2006.01)
*B65D 63/10* (2006.01)
(Continued)

(52) U.S. Cl.
CPC .............. *F16L 23/04* (2013.01); *F16L 47/14* (2013.01); *B65D 63/1027* (2013.01); *F16B 7/0426* (2013.01)

(58) Field of Classification Search
CPC ...... F16L 23/04; F16L 47/14; B65D 63/1027; B65D 63/1063
(Continued)

(56) References Cited

U.S. PATENT DOCUMENTS 3,235,293 A * 2/1966 Condon
3,822,075 A   7/1974 Duncan
(Continued)

FOREIGN PATENT DOCUMENTS

DE   10 2011 009 303   3/2012
DE   10 2014 214 953   3/2016
(Continued)

OTHER PUBLICATIONS

Patent Cooperation Treaty, "International Search Report," and English translation of international search, issued in International Patent Application No. PCT/EP2016/071786, dated Nov. 11, 2016, document of 4 pages.
(Continued)

*Primary Examiner* — Zachary T Dragicevich
(74) *Attorney, Agent, or Firm* — Akerman LLP; Peter A. Chiabotti

(57) ABSTRACT

A clamping-action tie, in particular for docking two lines or flanges, which consists of at least one flexible tie with a closure end and a free end, which should be connected to the closure end, which tie can be closed in a stepped manner, with latching action, or stepless manner around an axis, wherein at least one closing side of the tie is intended to interact mechanically with the closure end during a closing operation, wherein the closing side and/or a further side of the tie, in the form of a clamping side, has at an axial spacing apart from one another over the length of the tie, at at least two circumferential locations, at least two roughly radially inwardly directed elevations directed towards a tied article
(Continued)

which runs radially inwards in the direction of the axis, wherein a-clamping region is made between each interacting arrangement of elevations.

16 Claims, 3 Drawing Sheets

(51) Int. Cl.
 *F16L 47/14* (2006.01)
 *F16B 7/04* (2006.01)

(58) Field of Classification Search
 USPC .................. 285/365, 407; 24/16 PB, 19
 See application file for complete search history.

(56) References Cited

U.S. PATENT DOCUMENTS

| | | | | |
|---|---|---|---|---|
| 4,466,159 A | * | 8/1984 | Burrage | B65D 63/10 |
| | | | | 24/16 PB |
| 5,881,435 A | * | 3/1999 | Jermyn, Jr. | B65D 63/1036 |
| | | | | 24/16 PB |
| 2006/0096066 A1 | * | 5/2006 | Wambaugh | B65D 63/1063 |
| | | | | 24/16 PB |
| 2006/0191111 A1 | * | 8/2006 | Pearson | 24/16 PB |
| 2007/0028426 A1 | * | 2/2007 | Laporte | B65D 63/1063 |
| | | | | 24/16 PB |
| 2009/0158559 A1 | * | 6/2009 | Chardon | 24/16 PB |
| 2010/0132165 A1 | | 6/2010 | Shor et al. | |
| 2012/0074341 A1 | | 3/2012 | Untch | |
| 2012/0227221 A1 | * | 9/2012 | Whitaker | F16L 23/04 |
| 2013/0127162 A1 | * | 5/2013 | Fritskey | F16L 23/04 |
| | | | | 285/407 |

FOREIGN PATENT DOCUMENTS

| | | |
|---|---|---|
| EP | 1 230 505 | 7/2008 |
| GB | 886 036 | 1/1962 |
| WO | 2009/051591 | 4/2009 |

OTHER PUBLICATIONS

German Patent Office, "Office Action," issued in German Patent Application No. DE 10 2015 115 544.3, dated Aug. 26, 2016, document of 5 pages.

* cited by examiner

A-A

CLAMPING-ACTION TIE AND ALSO DOCKING METHOD AND COUPLING METHOD

CROSS REFERENCE TO RELATED APPLICATIONS

This application is a § 371 National Phase of PCT/EP2016/071786, filed Sep. 14, 2016, which claims priority to German Patent Application No. 10 2015 115 544.3, filed Sep. 14, 2015.

BACKGROUND

The i application relates to a clamping-action tie and also a docking method and a coupling method, in particular for docking or alternatively coupling of two lines, flanges or similar, particularly preferred for a contamination-free docking, for example, of two containers or two lines.

Two lines or flanges are generally connected according to technical standards, for example, DIN 32676, by means of two locking clamps consisting of encircling halves. The term tri-clamp connection is also frequently used here. Such locking clamps, as, for example, described in EP 1 230 505 BI, are locked on an open side by means of wing nuts or similar, following the encircling of the line or flange. The halves encircle the line or flange in an ever tighter manner, whereby a possibly uniform pressure over the whole circumference is sought. Embodiments made out of plastic are also known. Lastly—when sealed to the outside—such docking aids allow for a throughput, for example, of bulk material, to be passed through it, along an axis.

Known docking methods for the contamination-free docking of two containers or pipelines, for example, with a segment valve or according to DE 10 2011 009 303, often have interfaces, which are often very complex and expensive to connect for a sufficient seal.

No matter whether in the case of connections of firefighting hoses or for expensive systems engineering: clamps for connecting of lines, flanges or the like, should be manufacturable with possibly limited unit costs, be without problems in their operation and/or usable without limitation for combinations of plastic and metal materials.

SUMMARY

This problem is solved by a clamping-action tie having the features and structures recited herein including its defining characteristics and a docking method and a coupling method disclosed herein.

The present disclosure provides further advantageous embodiments herein.

According to the disclosure, one single 360° encircling manufactured tie clamps two axially abutting parts against each other, whereby one hand holds the parts and the other hand can pull upon a free end of the clamping tie, with or without further tools, to complete the clamping.

Advantageous embodiments of the clamping-action ties consist completely of plastic and are foreseen for single-use applications.

Depending on the embodiment, the clamping-action tie according to the disclosure is easy to open and/or to close and at the same time very reliable. Versatile application possibilities are available.

Making use of known ergonomic cable tie tools, it is possible, without risk of injury and in a manner that is gentle on the joints, to tighten in a defined way and make a flush cut, in one single action.

The docking method according to the disclosure for the contamination-free docking of two containers or pipelines advantageously uses such a clamping-action tie. The docking method can be automated and is safe.

DETAILED DESCRIPTION

Brief Description of the Drawings

Hereinafter, the features and structures of the present disclosure will be more closely described on the basis of an embodiment illustrated in the Figures. They show.

An embodiment according to the disclosure of a clamping-action tie 1 is represented in FIGS. 1 through 6. The representations of FIGS. 1 through 3 with clamp bundled line ends comprising flanges (4) abutting one another, together with the representations of FIGS. 4 through 6 without the tied article, when taken together, illustrate the coupling method according to the disclosure.

For a better overview, the reference symbols are not indicated in all of the Figures.

Figure 1:
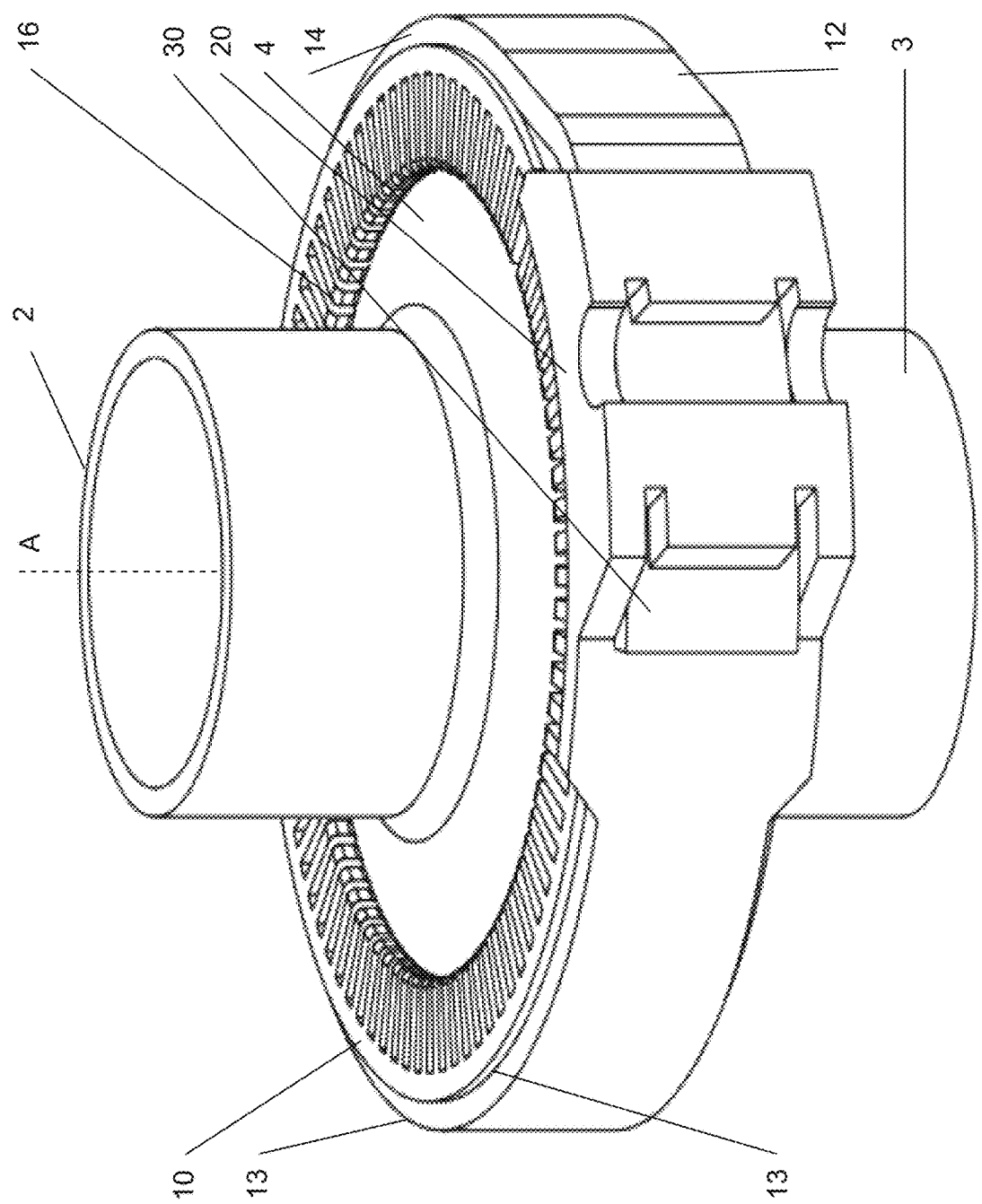
FIG. 1: a perspective representation of a clamping-action tie closed around a tied article.
Figure 2:
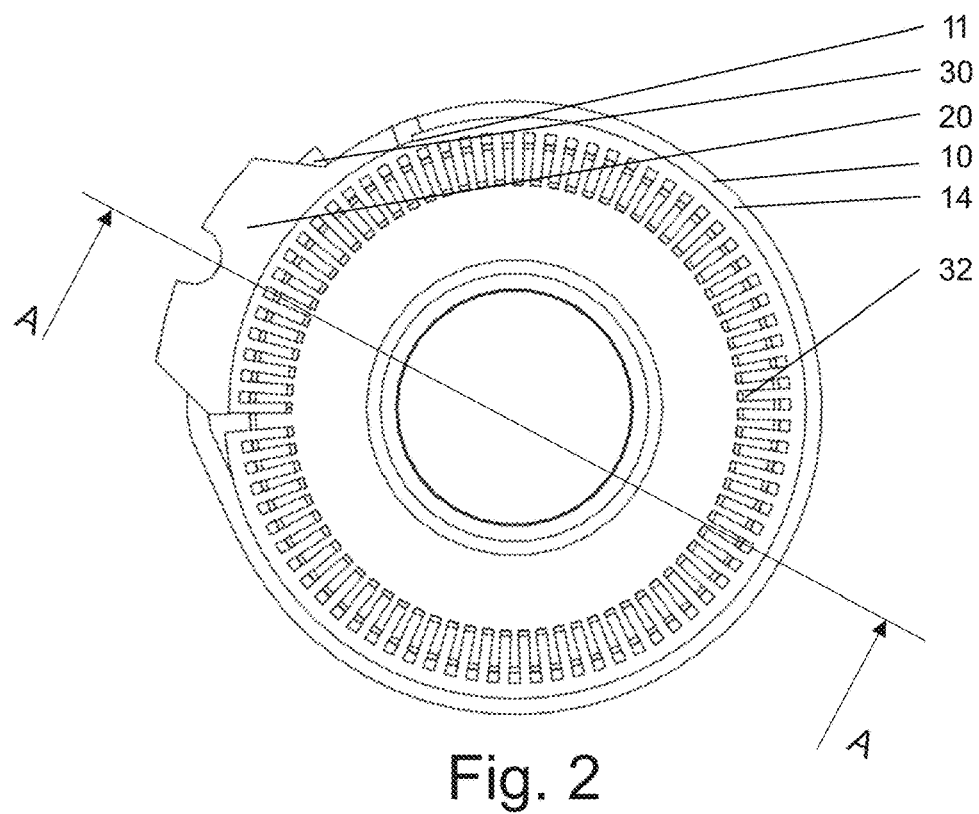
FIG. 2: a plan view in an axial direction on the clamping-action tie with the tied article from FIG. 1, FIG. 3: an axial cross-section through the clamping-action tie and the tied article from FIG. 1, FIG. 4: a perspective view over an extended clamping-action tie viewing the side that is to later be the radially outer side.
Figure 3:
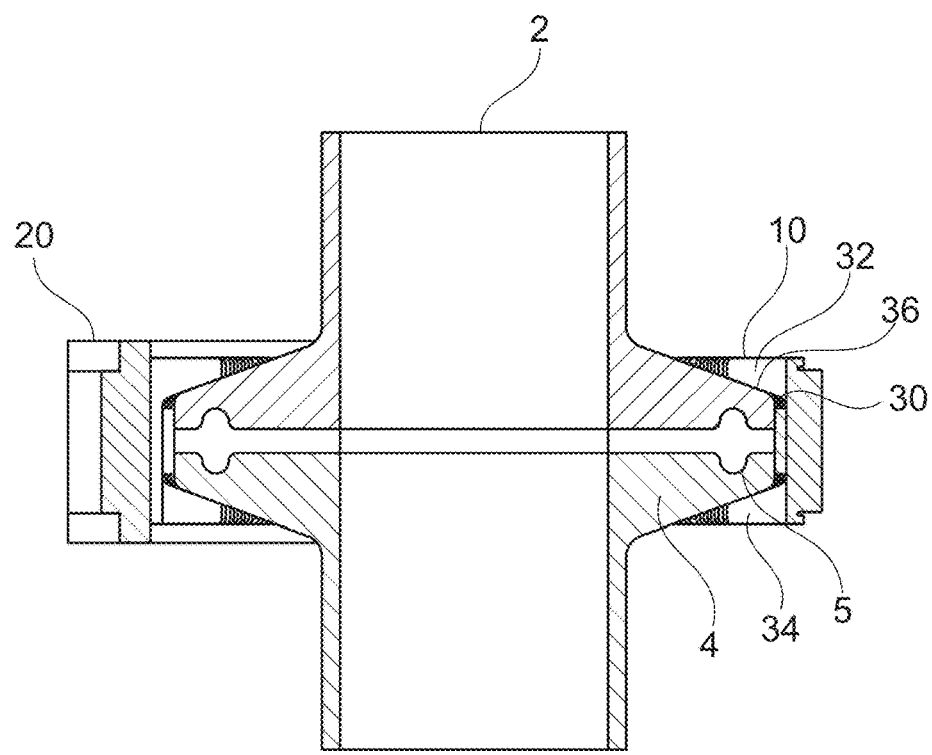
Figure 4:
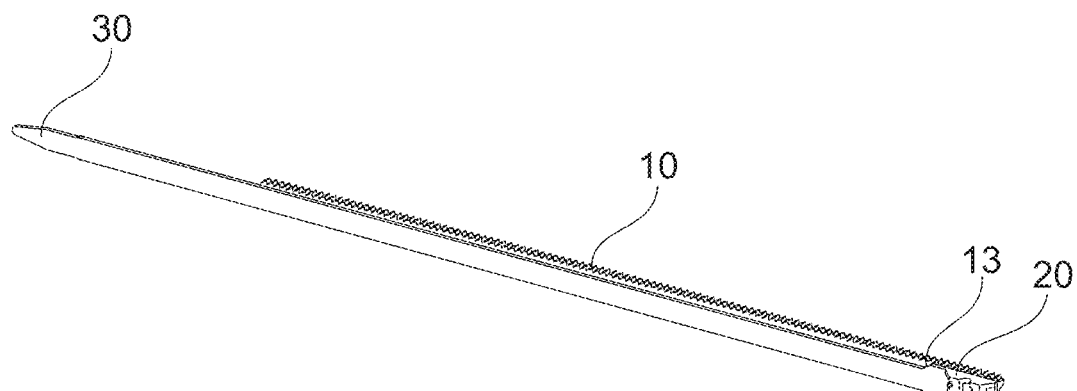

According to the FIGS. 1 through 3, the clamping-action tie 1 docks two lines 2, 3 with flanges 4 on top of one another. In the axial cross-section of the FIG. 3, it is shown that a circumferential gasket can be inserted in the groove 5 of the flanges 4.

According to this embodiment example, the clamping-action tie 1 exhibits a flexible tie 10 with a closure end 20 and a free end 30 that is to be brought into connection with the closure end 20. The tie 10 is preferably closed in a stepped manner, with latching action, around an axis A, following the example of a cable tie. During a latching process, a closing side 12 of the tie 10 is intended to interact mechanically with the closure end 20, going from the extended position according to FIGS. 4 through 6 to the engaged position according to FIGS. 1 through 3, as soon as the free end 30, in the case in point, penetrates in the closure end 20.

In the case in point, in an axial direction A, the tie 10 exhibits on top of one another from top to bottom
 an upper narrow side 14,
 a radially internally-arranged clamping side 16 with clamping teeth that stick out from the flanges
 and additionally, and parallel to the same, a further radial closing side 12 that is arranged externally and
 a lower narrow side of the tie 10.

Radially on the inside, the engagement teeth are laid out with elevations 32, 34 at an axial A spacing apart from one another. A latching tooth has two elevations 32, 34 and a latching clamping region 30 between the flanges 4. Over the length of the tie 10, such elevations are to be arranged over at least two circumferential locations in order for the embodiments disclosed herein to function successfully. In the case in point, there are evidently more elevations.

The clamping region 30 is made between an interacting arrangement of elevations, here made up of two V-shaped radially inwardly distanced sides, which are distanced from the tie 10.

In this particular case, in particular in FIG. 3, the two elevations 32, 34 of the respective interacting arrangement of elevations are arranged as sides that are symmetrically tapered to one another, each of which with a clamping edge 36 laid out with a taper in the direction of the tie, in order to direct sustained force during the closing procedure and afterwards, in the tied article, namely, in particular, axial and radial forces.

According to the depicted embodiment example, the elevations 32, 34 are molded out of the same material as the clamping-action ties. According to this particularly preferable embodiment, the clamping-action tie is an injection molded part stemming from a single plastic molding process.

The tie 10 of the embodiment example that is represented is a band made of plastic. The closure end 30 is represented schematically. According to known cable tie variants, in the framework of the application, the closure can be designed as a non-destructively releasable, closable and reclosable closure.

Figure 5:
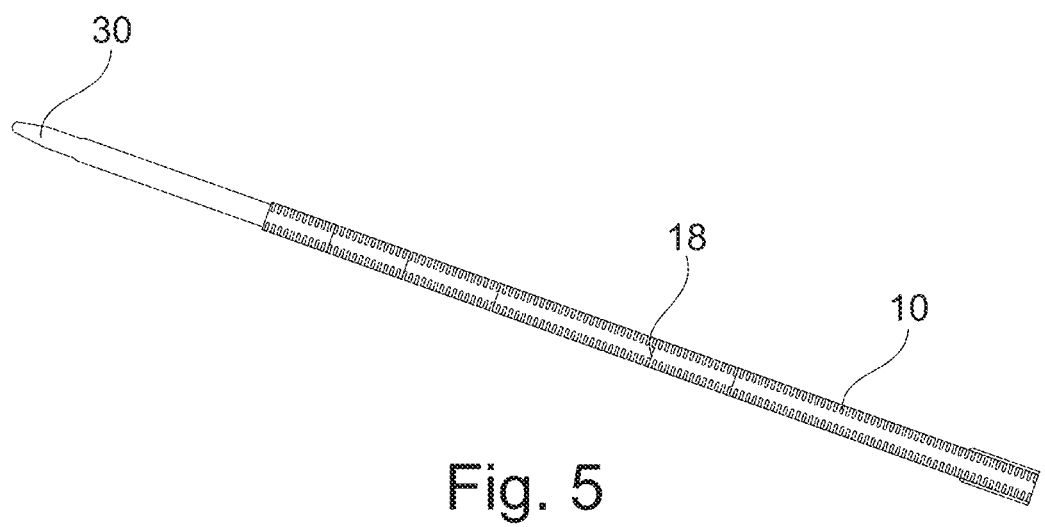
FIG. 5: a plan view on the extended clamping-action tie from FIG. 4, viewing the clamping side that is designed to later be the radially internal side.
Figure 6:
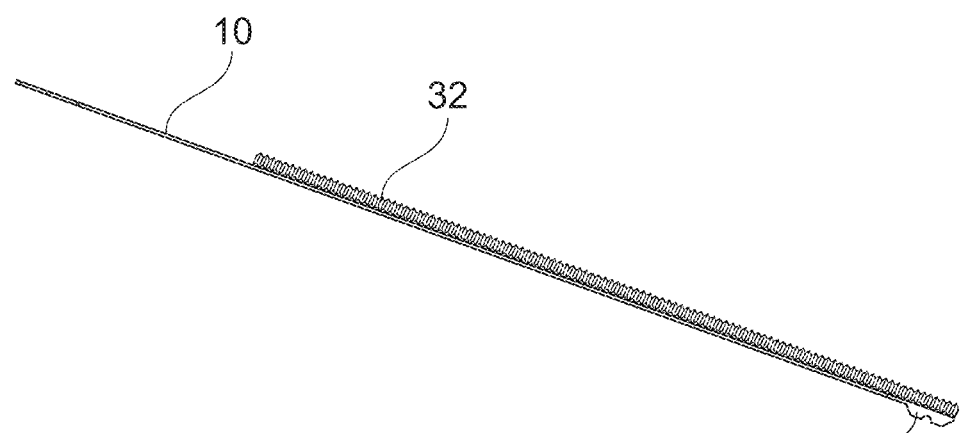
FIG. 6: a side view of the narrow side of the extended clamping-action tie from FIG. 4 with the clamping side oriented downward.

According to FIG. 5, the clamping-action tie is adaptably designed with defined breaking points 18 for a plurality of diameters of the clamping bundle. The defined breaking points are arranged between radially inward sections of the clamping side. The sections are manually separable when the sections are snapped or twisted off at the defined breaking points 18.

An outer band exhibiting the closing side 12 exhibits two axial inside contours 13 that are separated from one another, with said inside contours 13 being designed to be congruent to the surface of the outer contours of one of the inside bands exhibiting the clamping side 16. These bands can be laid out contiguously to one another in a planar manner, including when the total clamping-action tie is manufactured in one single plastic molding process.

In a closing region near the closure end 20, or that is contiguous to the same, a radially inwardly directed ledge 11 is formed, that one could describe as a step. According to the illustrated advantageous embodiment, narrow side constriction areas are carried out on the tie 10 from the narrow sides in a tapered manner to one another.

A coupling method according to the disclosure demonstrably includes in the Figures the process stages: encircling of a single clamping-action tie 1 around two couple ends that are to be bound by clamping, such as line ends 2, 3 with flanges 4 or similar, up until such a point that the free end 30 penetrates in the closure end 20 of the clamping-action tie 1. A subsequent adjustment of the couple ends, in particular of their sealing surfaces, can take place thereafter, eventually through the insertion of a gasket between the couple ends. Only thereafter is the connection tightened by means of torque on the free end 30, whereby the couple ends are clamped to one another.

LIST OF REFERENCE SYMBOLS

1 Clamping-action tie
2 Line
3 Line
4 Flange
10 Tie
11 Ledge
12 Closing side
13 Constriction
14 Narrow side
16 Clamping side
18 Defined breaking points
20 Closure end
30 Clamping region
32 First elevation
34 Second elevation
36 Clamping edge
A Axis

The invention claimed is:

1. A clamping-action tie, comprising:
a flexible tie for docking two lines or flanges, the flexible tie comprising a closure end and a free end, the free end configured to be connected to the closure end, wherein the flexible tie is configured to be closed in a stepped manner, with latching action, or in a stepless manner around an axis,
wherein a closing side of the flexible tie is configured to interact mechanically with the closure end during a closing operation, wherein the closing side and/or a further side of the flexible tie in the form of a clamping side, and
a closing part comprising, at an axial spacing apart from one another, at two or more circumferential locations, two or more roughly radially inwardly directed elevations directed towards a tied article which runs radially inwards in a direction of the axis and further comprising at least one breaking point located between each roughly radially inwardly directed elevations, wherein a clamping region is made between each interacting arrangement of elevations,
wherein the closing part is designed as adaptable for a plurality of diameters of the tied article by removing roughly radially inwardly directed elevations via the at least one breaking point;
wherein the elevations of the respective interacting arrangement of elevations are arranged as sides that are symmetrically tapered to one another, each of which with a clamping edge laid out with a taper in the direction of the tie, in order to direct sustained force during the closing procedure and afterwards, in the tied article.

2. The clamping-action tie according to claim 1, wherein both of the elevations of the respective interacting arrangement of elevations are arranged as sides that are symmetrically tapered to one another.

3. The clamping-action tie according to claim 1, wherein the elevations are molded out of a material from which the clamping-action tie is molded; and/or are connected as separate parts on the clamping side with the clamping-action tie.

4. The clamping-action tie according to claim 1, wherein at least one of the axial spaced elevations is at least in sections circumferentially formed around the tied article.

5. The clamping-action tie according to claim 1, wherein the tie is a band, a cable or a chain.

6. The clamping-action tie according to claim 1, wherein the clamping-action tie is injection molded out of one single material.

7. The clamping-action tie according to claim 1, wherein the closure end features a non-destructive releasable closable closure.

8. The clamping-action tie according to claim 1, wherein the tie is executed at least in circumferential sections around the axis as continuously separated and contiguous to one another, wherein the clamping side is formed on movable clamping sections that are arranged radially inside the continuously circumferential support tie on the support tie.

9. The clamping-action tie according to claim 1, wherein an outer band exhibiting the closing side exhibits two axial inside contours that are separated from one another, with the inside contours being designed to be congruent to a surface of the outer contours of one of the inside bands exhibiting the clamping side.

10. The clamping-action tie according to claim 1, wherein in a closing region near the closure end or that is contiguous to the closure end, a radially inwardly directed ledge is formed, and narrow side constriction areas are carried out on the tie from the narrow sides in a tapered manner to one another.

11. A clamping-action tie, comprising:
a flexible tie for docking two lines or flanges, the flexible tie comprising a closure end and a free end, the free end configured to be connected to the closure end, wherein the flexible tie is configured to be closed around an axis and wherein the flexible tie is designed as adaptable for a plurality of diameters of a tied article,
wherein a radially internally-arranged clamping side of the tie forms clamping teeth laid out with elevations at an axial spacing apart from one another,
a closing side of the tie is configured to interact mechanically with the closure end during a closing operation, wherein the closing side and/or a further side of the tie in the form of a clamping side, has at an axial spacing apart from one another over a length of the tie, at two or more circumferential locations, two or more of the roughly radially inwardly directed elevations directed towards a tied article which runs radially inwards in a direction of the axis, wherein a clamping region is made between each interacting arrangement of elevations;
wherein one or more roughly radially inwardly directed elevations are removable via breaking points located between each roughly radially inwardly directed elevations; and
wherein the tie is configured to conform to a plurality of diameters of the tied article by removing one or more of the roughly radially inwardly directed elevations;
wherein the elevations of the respective interacting arrangement of elevations are arranged as sides that are symmetrically tapered to one another, each of which with a clamping edge laid out with a taper in the direction of the tie, in order to direct sustained force during the closing procedure and afterwards, in the tied article.

12. The clamping-action tie according to claim 11, wherein the elevations are molded out of a material from which the clamping-action tie is molded; and/or are connected as separate parts on the closing side with the clamping-action tie.

13. The clamping-action tie according to claim 11, wherein at least one of the axial spaced elevations is at least in sections circumferentially formed around the tied article.

14. The clamping-action tie according to claim 11, wherein the tie is executed at least in circumferential sections around the axis as continuously separated and contiguous to one another, wherein the clamping side is formed on movable clamping sections that are arranged radially inside the continuously circumferential support tie on the support tie.

15. The clamping-action tie according to claim 11, wherein an outer band exhibiting the closing side exhibits two axial inside contours that are separated from one another, with the inside contours being designed to be congruent to a surface of the outer contours of one of the inside bands exhibiting the clamping side.

16. The clamping-action tie according to claim 15, wherein in a closing region near the closure end or that is contiguous to the closure end, a radially inwardly directed ledge is formed, and narrow side constriction areas are carried out on the tie from the narrow sides in a tapered manner to one another.

* * * * *